Jan. 9, 1923.

G. G. CLARK.
TWINE HOLDER.
FILED NOV. 5, 1921.

1,441,265.

INVENTOR
Guy G. Clark.
BY his ATTORNEY
T. F. Bourne

Patented Jan. 9, 1923.

1,441,265

UNITED STATES PATENT OFFICE.

GUY GAYLER CLARK, OF UPPER MONTCLAIR, NEW JERSEY, ASSIGNOR TO LUDLOW MANUFACTURING ASSOCIATES, OF BOSTON, MASSACHUSETTS, A VOLUNTARY ASSOCIATION OF MASSACHUSETTS.

TWINE HOLDER.

Application filed November 5, 1921. Serial No. 512,967.

*To all whom it may concern:*

Be it known that I, GUY G. CLARK, a citizen of the United States, and resident of Upper Montclair, in the county of Essex and State of New Jersey, have invented certain new and useful Improvements in Twine Holders, of which the following is a specification.

The object of my invention is to provide simple and convenient means to enclose a ball of cord, twine and the like, to permit the ball to be suspended by its own material and in turn to support the enclosing container, the latter permitting the cord or twine to be pulled from the container as required, whereby the ball will be kept from loosening and becoming entangled.

My invention comprises a ball of cord, twine or the like and an enclosing container therefor, said container having openings for the passage of opposite portions of the cord or twine, the outer portion of the cord or twine being fastened to the ball and extended through one of said openings to suspend the ball and its container, the inner portion of said cord or twine extending through said other opening of the container in position to be pulled therefrom.

Figure 1:
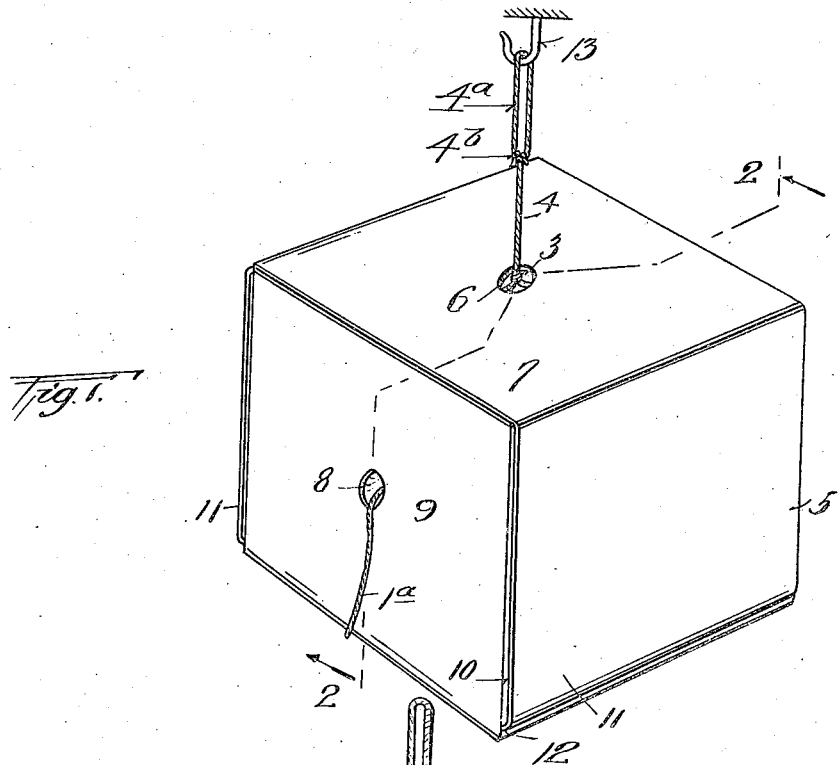
Figure 2:
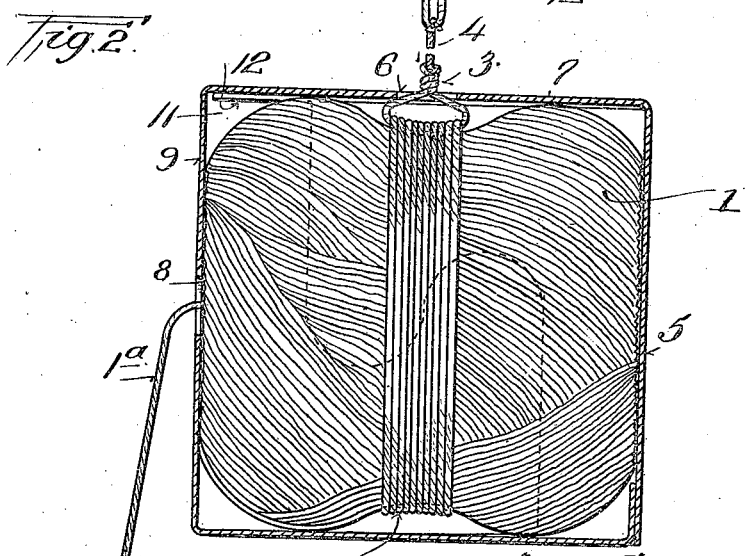

I have illustrated an embodiment of my invention in the accompanying drawings, wherein Figure 1 is a prospective view illustrating a container from which opposite portions of a cord protrude, and Fig. 2 is a cross section, substantially on the plane of line 2, 2, in Fig. 1.

The numeral 1 indicates a ball of cord, twine or the like, which may be of usual construction, having its outer end portion wrapped one or more times around the ball at 2 and tied or knotted in any suitable way, as indicated at 3, so that the wrapping 2 will not become loosened. At 4 is a supporting extension from the ball, which may be the outer end portion of the cord or twine extending from the knot 3. The ball, arranged as described, is enclosed within a suitable container 5, which may be in the nature of a carton or box of pasteboard or other suitable material, such as a collapsible carton adapted to be set up for use. The container has an opening 6 in one wall 7 and an opening 8 in another wall 9, preferably at right angles to wall 7.

The ball 1 is inserted within the container, as through a side opening 10 to be closed by one of the walls or flaps 11 having tongue 12 inserted within the container to retain said wall or flap. The extending portion 4 of the cord or twine is passed through opening 6 to be suspended by any suitable support, as by means of a hook 13. The portion 4 of the cord or twine may be looped at 4ª and tied or knotted at 4ᵇ as a convenient means for its support. The free end portion 1ª of the ball, that is usually adapted to be pulled out of the middle of the ball, is passed from the container through its opening 8 which is shown located opposite the middle portion of the ball.

When the device is assembled as set forth the ball may be supported by hanging the extension 4 on a support, whereby the container will be supported on and by the ball, whereby the free central end portion 1ª of the cord or twine may be pulled from the ball through the side opening 8 of the container for use, as desired. The container will keep the ball protected against unwinding and tangling, and since the ball is supported from its exterior the inner portion of the ball will be free to be pulled out, through the container, as required without danger of the outer windings of the ball becoming snarled.

A further advantage of my improvement is that the ball of cord or twine will be kept fresh and clean within the container, not only as retained for use but for shipping and as offered for sale.

My invention is simple and cheap to manufacture, convenient in use and not liable to get out of order.

I use the term "cord" to include also string, twine, rope, strands and the like, usually put up in wound so-called ball form.

Having now described my invention, what I claim is:—

1. The combination of a ball of cord, with an enclosure containing the ball and having openings, said ball having an extension projecting through one of said openings to support the ball and the enclosure thereon, the other opening being in position for the passage therethrough of the cord at the middle portion of the ball.

2. The combination of a ball of cord, with an enclosure containing the ball and having openings, in different walls at an angle to each other, said ball having an extension projecting through one of said openings to support the ball and the enclosure thereon, the other opening opposing the middle of the ball, the inner portion of the ball extending through said opening to be pulled therefrom for use.

3. The combination of a ball of cord having an outer portion wrapped therearound and tied, and an extension from the ball, with an enclosure containing the ball and provided with an opening, said extension projecting through said opening to support the ball and the enclosure thereon, said enclosure having another opening opposite the middle of the ball, the inner portion of the cord extending through said opening to be pulled from the enclosure for use.

4. The combination of a ball of cord having an outer portion wrapped therearound and tied, said portion extending freely from the ball with an enclosure containing the ball and provided with an opening, said extending portion of the ball projecting through said opening to support the ball and the enclosure thereon, said enclosure having another opening opposite the middle of the ball, the inner portion of the ball extending through said opening to be pulled from the enclosure for use.

Signed at New York city, in the county of New York, and State of New York, this 3d day of November, A. D. 1921.

GUY GAYLER CLARK.